United States Patent
Wang et al.

(10) Patent No.: US 9,497,667 B2
(45) Date of Patent: Nov. 15, 2016

(54) FAST WIFI TO LTE HANDOVER

(71) Applicant: Telefonaktiebolaget L M Ericsson (publ), Stockholm (SE)

(72) Inventors: Chunbo Wang, Shanghai (CN); Daniel Nilsson, Alvangen (SE); Lars-Bertil Olsson, Angered (SE); Stefan Rommer, Vastra Frolunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/385,364

(22) PCT Filed: Sep. 11, 2014

(86) PCT No.: PCT/CN2014/086274
§ 371 (c)(1),
(2) Date: Sep. 15, 2014

(87) PCT Pub. No.: WO2016/037333
PCT Pub. Date: Mar. 17, 2016

(65) Prior Publication Data
US 2016/0080981 A1    Mar. 17, 2016

(51) Int. Cl.
*H04W 36/00* (2009.01)

(52) U.S. Cl.
CPC ................................. *H04W 36/0022* (2013.01)

(58) Field of Classification Search
None
See application file for complete search history.

(56) References Cited

U.S. PATENT DOCUMENTS

| 2002/0082018 | A1* | 6/2002 | Coskun et al. ............... 455/439 |
| 2005/0237977 | A1* | 10/2005 | Sayeedi ......................... 370/331 |
| 2012/0155427 | A1 | 6/2012 | Dolan |
| 2013/0094471 | A1 | 4/2013 | Zhao et al. |

(Continued)

FOREIGN PATENT DOCUMENTS

| WO | 2009062440 A1 | 5/2009 |
| WO | 2009154640 A2 | 12/2009 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401, v.12.5.0, Jun. 2014, 305 pages.

(Continued)

*Primary Examiner* — Chi H Pham
*Assistant Examiner* — Shick Hom
(74) *Attorney, Agent, or Firm* — Rothwell, Figg, Ernst & Manbeck, P.C.

(57) ABSTRACT

A network node, and a method at the network node, for handing over a mobile terminal between a first RAT and a second RAT in a wireless communications network. In some embodiments, the method comprises establishing a PDN connection with the mobile terminal via the first RAT, receiving a request for handover of the mobile terminal from the first RAT to the second RAT, performing the requested handover, maintaining PDN connection context for the PDN connection established via the first RAT for a time period, and releasing the PDN connection context at expiry of the time period.

18 Claims, 8 Drawing Sheets

(56) References Cited

U.S. PATENT DOCUMENTS

2014/0233384 A1\* 8/2014 Howard ........................ 370/235
2015/0038143 A1\* 2/2015 Kilpatrick et al. ........... 455/436
2015/0131615 A1\* 5/2015 Miklos et al. ................ 370/331

OTHER PUBLICATIONS

International Search Report and Written Opinion issued in corresponding application No. PCT/CN2014/086274, dated Jun. 10, 2015, 13 pages.

\* cited by examiner

FAST WIFI TO LTE HANDOVER

CROSS-REFERENCE TO RELATED APPLICATION

This application is a 35 U.S.C. §371 National Phase Entry Application from PCT/CN2014/086274, filed Sep. 11, 2014, and designating the United States.

TECHNICAL FIELD

The present invention relates to a network node and a method at the network node of handing over a mobile terminal between a first RAT and a second RAT in a wireless communications network. The invention further relates to a computer program performing the method according to the present invention, and a computer program product comprising computer readable medium having the computer program embodied therein.

BACKGROUND ART

In the art, handover from non-3rd Generation Partnership Project (3GPP) networks (e.g., WiFi) to 3GPP networks such as Long Term Evolution (LTE) networks follows a well-known attach procedure, for instance defined in 3GPP specification TS 23.401 with reference to Figure 5-3-2-1.1 comprised therein, if there is no other Packet Data Network (PDN) connection established for a mobile terminal, such as a User Equipment (UE), over LTE.

A large number of rounds of communication must be undertaken by various network nodes in the LTE network, including an Mobility Management Entity (MME), a Serving Gateway (SGW), a Packet Data Network Gateway (PGW), a Home Subscriber Server (HSS), etc., for handover to be possible.

The MME needs to perform an update location procedure towards HSS, and thereafter that MME needs to trigger a create session procedure towards the SGW to create the UE context, and the SGW triggers the create session procedure towards the PGW accordingly. The PGW must create bearer context for the UE upon receiving a Create Session Request, and if dynamic Policy and Charging Control (PCC) is deployed, the PGW executes a Policy and Charging Enforcement Function (PCEF)-Initiated Internet Protocol (IP)-Connectivity Access Network (CAN) with a Policy and Charging Rules Function (PCRF) to report the new IP CAN type. The PGW returns a Create Session Response to the SGW after PCRF update, and the SGW returns Create Session Response to the MME accordingly. After a successful create session procedure, the MME triggers an initial context setup procedure towards an eNodeB to establish radio resources. Upon successful radio bearer establishment, the UE can send uplink traffic towards the LTE network.

A problem in the art is that a great deal of signaling is required in the network for handover to be effected, resulting in latencies in handover and extensive loading of network nodes.

SUMMARY

An object of the present invention is to solve, or at least mitigate, this problem in the art and thus to provide an improved method and network node implementing the method of performing handover of a mobile terminal in a wireless communications network.

This object is attained in a first aspect of the present invention by a method at a network node of a packet core network of performing handover of a mobile terminal between a first Radio Access Technology (RAT), and a second RAT in a wireless communications network. The method comprises receiving a request for handover of the mobile terminal to the second RAT, establishing a Packet Data Network (PDN) connection with the mobile terminal via the first RAT, and performing handover of the mobile terminal to the second RAT. The method further comprises maintaining PDN connection context for the PDN connection established via the first RAT for a time period, and releasing the PDN connection context at expiry of the time period.

This object is attained in a first aspect of the present invention by a network node of a packet core network of performing handover of a mobile terminal between a first RAT and a second RAT in a wireless communications system. The network node comprises a processing unit and a memory, which memory contains instructions executable by the processing unit, whereby the network node is operative to establish a PDN connection with the mobile terminal via the first RAT, receive a request for handover of the mobile terminal to the second RAT, perform handover of the mobile terminal to the second RAT, maintain PDN connection context for the PDN connection established via the first RAT for a time period, and release the PDN connection context at expiry of the time period.

Further provided are a computer program performing the method according to the present invention, and a computer program product comprising computer readable medium having the computer programs embodied therein.

Advantageously, when performing handover from a first RAT being 3GPP (LTE/3G/2G; in the following exemplified by LTE) to a second non-3GPP RAT in the form of for instance WiFi, by maintaining the PDN context of the PDN connection established over LTE for a time period, which time period may be predetermined or alternatively set on-the-fly, and releasing the PDN connection context at expiry of the time period, a great deal of signalling in the LTE Evolved Packet Core (EPC) network is avoided when subsequently handing over the mobile terminal from WiFi back to LTE, in case the handover is undertaken before expiry of said time period. Further, latency in mobile terminal handover from WiFi to LTE—i.e. from a Wireless Local Area Network (WLAN) to an Evolved Universal Terrestrial Radio Access Network (E-UTRAN)—is greatly reduced since a number of rounds of communication in the EPC network, between network nodes such as a Mobility Management Entity (MME), a Serving Gateway (SGW), a Packet Data Network Gateway (PGW), and a Home Subscriber Server (HSS), no longer must be performed due to the maintaining of the context of the already established "old" PDN connection.

To the contrary, in the art, there is a long handover delay due to the need to update location with the HSS, create session with the SGW/PGW and perform Policy and Charging Rules Function (PCRF) update. When the mobile terminal moves from WiFi to 3GPP, it is normally due to limited WiFi coverage, and therefore the handover should have very short delay considering the rapid radio degradation, which is a different scenario compared to handover from 3GPP to WiFi, in which case 3GPP macro coverage still normally exists. Further, the current standard procedure for WiFi to 3GPP handover introduces a high degree of signaling load in the network. The number of updates performed towards the HSS shall preferably be minimized to reduce the load on the centralized HSS node, which manages all subscriber data. In the current standard, once the handover procedure for the mobile terminal from 3GPP to WiFi has been completed, the PDN context for the established PDN connection is released/deactivated, and the corresponding procedure must be repeated once the mobile terminal is to be handed over from WiFi back to 3GPP.

With the present invention, these problems in the art are overcome, since the PDN connection context is maintained for a time period (for instance by setting a guard timer controlling the time period) when handing over the mobile terminal from 3GPP to WiFi, and if handover of the mobile terminal is undertaken from WiFi back to 3GPP before the time period has expired, the maintained PDN connection context can be utilized for the handover, since no detach procedure is undertaken for the mobile terminal as long as the time period has not expired. The extensive rounds of communication that needs to be undertaken, as discussed hereinabove with reference to the prior art, are hence avoided. In other words, there is no need to engage in the previously described extensive signaling (update location with the HSS, create session with the SGW/PGW and perform PCRF update) for WiFi-to-3GPP handover as long as the time period set for maintaining the PDN context during the preceding 3GPP-to-WiFi handover has not expired.

As a result, with the present invention, since the signaling is greatly reduced, the number of successful handovers increases. As a further result, due to the reduced latency, the user experience is improved.

The method described in the above may be performed by a network node such as the PGW in the packet core network, either by itself or in cooperation with other network nodes in the packet core network such as the SGW and/or the MME.

In a further embodiment, when the mobile terminal is to be handed over from the non-3GPP (e.g. WiFi) back to the 3GPP (e.g. LTE), a PDN connection is established with the mobile terminal via the WLAN, and a request for handover of the mobile terminal to the E-UTRAN is received for instance by the MME (or SGSN) in the EPC network. If it is determined that the PDN context of the previously established PDN connection with the E-UTRAN is still maintained for the mobile terminal, i.e. the time period set by the guard timer has yet not expired, the MME effects handover of the mobile terminal from the WLAN to the E-UTRAN without performing update location with the HSS and without performing a create session process with the SGW.

In further embodiments of the present invention, the MME may determine whether the PDN context of the previously established PDN connection with the E-UTRAN is still maintained for the mobile terminal by checking whether it has access to UE subscription data that corresponds to a subscriber identity indicated in the request for handover to the E-UTRAN. If that is the case, the MME/SGSN effects handover of the mobile terminal from the WLAN to the E-UTRAN without performing update location with the HSS and without performing a create session process with the SGW. Thus, if the MME/SGSN has access to the context of the mobile terminal, the guard timer has yet not expired, and the mobile terminal has still not been detached from the E-UTRAN following the handover from E-UTRAN to WLAN.

Further embodiments of the present invention will be described in the detailed description of the present application.

It should be noted that the term "PDN connection context" encompasses the equivalent term "PDP context" previously used in General Packet Radio Service (GPRS) networks. The "PDN connection context", also known as "PDN context", comprises information relating to the PDN connection between the mobile terminal and the MME/SGSN/PGW. It includes identifying information about the mobile customer used by network nodes to properly forward call data to a next hop in the network. The identifying information may include for instance the customer's IP address, the IMSI number of the mobile terminal, and endpoint IDs of nodes such as SGSN, MME, SGW, PGW, etc., thereby ensuring that a uniquely identifiable connection is made.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
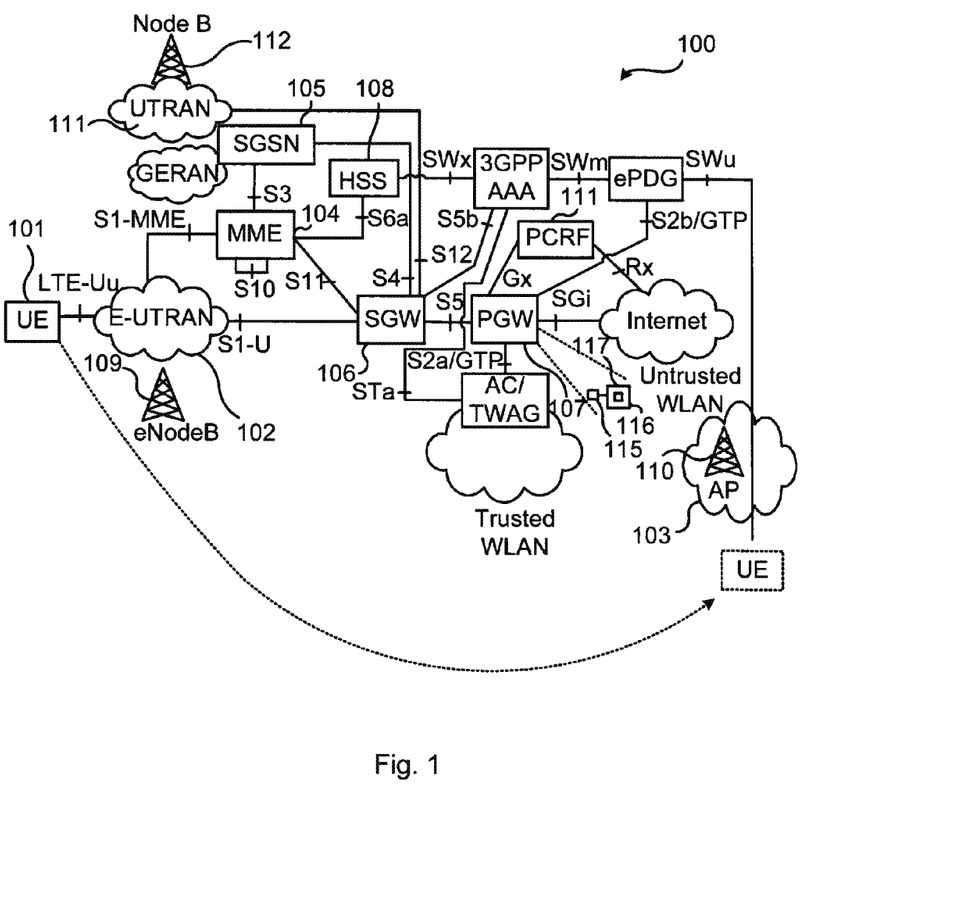
FIG. 1 shows a schematic overview of an exemplifying wireless communication system in which the present invention can be implemented.

FIG. 1 shows a schematic overview of an exemplifying wireless communication system 100 in which the present invention can be implemented. The wireless communication system 100 is an LTE based system. It should be pointed out that the terms "LTE" and "LTE based" system is here used to comprise both present and future LTE based systems, such as, for example, advanced LTE systems. It should be appreciated that although FIG. 1 shows a wireless communication system 100 in the form of an LTE based system, the example embodiments herein may also be utilized in connection with other wireless communication systems, such as e.g. Global System for Mobile Communications (GSM) or Universal Mobile Telecommunication System (UMTS), comprising nodes and functions that correspond to the nodes and functions of the system in FIG. 1.

The wireless communication system 100 comprises one or more base stations in the form of eNodeBs 109, operatively connected to a Serving Gateway (SGW) 106, in turn operatively connected to a Mobility Management Entity (MME) and a Packet Data Network Gateway (PGW) 107, which in turn is operatively connected to a Policy and Charging Rules Function (PCRF) 111. The eNodeB 109 is a radio access node that interfaces with a mobile radio terminal 101, e.g. a UE. The eNodeB 109 of the system forms the radio access network called Evolved Universal Terrestrial Radio Access Network (E-UTRAN) 102 for LTE communicating with the UE 101 over an air interface such as LTE-Uu. The core network in LTE is known as Evolved Packet Core (EPC), and the EPC together with the E-UTRAN 102 is referred to as Evolved Packet System (EPS). The SGW routes and forwards user data packets over the S1-U interface, whilst also acting as the mobility anchor for the user plane during inter-eNodeB handovers and as the anchor for mobility between LTE and other 3rd Generation Partnership Project (3GPP) technologies (terminating S4 interface and relaying the traffic between 2G/3G systems and PGW). For idle state UEs, the SGW terminates the downlink data path and triggers paging when downlink data arrives for the UE 101, and further manages and stores UE contexts, e.g. parameters of the IP bearer service, network internal routing information. It also performs replication of the user traffic in case of lawful interception. The SGW 106 communicates with the MME 104 via interface S11 and with the PGW 107 via the S5 interface. Further, the SGW may communicate with the NodeB 112 of the UMTS radio access network UTRAN in and with the GSM EDGE ("Enhanced Data rates for GSM Evolution") Radio Access Network (GERAN) via the S12 interface.

The MME 104 is responsible for idle mode UE tracking and paging procedure including retransmissions. It is involved in the bearer activation/deactivation process and is also responsible for choosing the SGW 106 for a UE 101 at the initial attach and at time of intra-LTE handover involving core network node relocation. It is responsible for authenticating the user by interacting with the Home Subscriber Server (HSS) 108. The Non-Access Stratum (NAS) signaling terminates at the MME 104 and it is also responsible for generation and allocation of temporary identities to UEs via the S1-MME interface. It checks the authorization of the UE 101 to camp on the service provider's Public Land Mobile Network (PLMN) and enforces UE roaming restrictions. The MME 104 is the termination point in the network for ciphering/integrity protection for NAS signaling and handles the security key management. Lawful interception of signaling is also supported by the MME. The MME 104 also provides the control plane function for mobility between LTE and 2G/3G access networks with the S3 interface terminating at the MME 104 from the Serving General Packet Radio Service (GPRS) Support Node (SGSN) 105. The MME 104 also terminates the S6a interface towards the home HSS 108 for roaming UEs 101. Further, there is an interface S10 configured for communication between MMEs for MME relocation and MME-to-MME information transfer.

The PGW 107 provides connectivity to the UE 101 to external packet data networks (PDNs) by being the point of exit and entry of traffic for the UE 101. A UE may have simultaneous connectivity with more than one PGW for accessing multiple PDNs. The PGW 107 performs policy enforcement, packet filtering for each user, charging support, lawful Interception and packet screening. Another key role of the PGW 107 is to act as the anchor for mobility between 3GPP and non-3GPP technologies such as WiMAX and 3GPP2 (CDMA 1× and EvDO). The interface between the PGW 107 and the packet data network, being for instance the Internet, is referred to as the SGi. The packet data network may be an operator external public or private packet data network or an intra operator packet data network, e.g. for provision of IP Multimedia Subsystem (IMS) services.

The PCRF 111 determines policy rules in real-time with respect to the radio terminals of the system. This may e.g. include aggregating information in real-time to and from the core network and operational support systems, etc. of the system so as to support the creation of rules and/or automatically making policy decisions for user radio terminals currently active in the system based on such rules or similar. The PCRF 111 provides the PGW 107 as with such rules and/or policies or similar to be used by the acting PGW 107 as a Policy and Charging Enforcement Function (PCEF) via interface Gx. The PCRF further communicates with the packet data network via the Rx interface.

The system further comprises a 3GPP Authentication, Authorization and Accounting (AAA) server, which takes care of the authentication, authorization and accounting of the UE 101 connecting to the EPC network via an untrusted WLAN 103 and an Evolved Packet Data Gateway (ePDG) across interface SWm. The ePDG further connects to the PGW 107 via interface S2B/GTP (both GPRS tunneling protocol (GTP) and Proxy Mobile IPv6 (PMIP) is possible). The 3GPP AAA server also connects to the HSS 108 via interface SWx, to the PGW via interface S6b, and to an AC/TWAG via interface STa. The AC/TWAG provides a gateway for the UE 101 between the EPC network and trusted WLAN and further connects to the PGW via interface S2a/GTP. The UE 101 connects to the WLAN 103 via an access point (AP) 110.

With further reference to FIG. 1, the method at a network node of the packet core network, such as e.g. the PGW 107, of performing handover of the UE 101 from the E-UTRAN 102 to the WLAN 103 is performed by a processing unit 115 embodied in the form of one or more microprocessors arranged to execute a computer program 117 downloaded to a suitable storage medium 116 associated with the microprocessor, such as a Random Access Memory (RAM), a Flash memory or a hard disk drive. Thus, as is illustrated by means of dashed lines in FIG. 1, the processing unit 115 and the storage medium are included in the UE 101. The processing unit 115 is arranged to carry out the method according to embodiments of the present invention when the appropriate computer program 117 comprising computer-executable instructions is downloaded to the storage medium 116 and executed by the processing unit 115. The storage medium 116 may also be a computer program product comprising the computer program 117. Alternatively, the computer program 117 may be transferred to the storage medium 16 by means of a suitable computer program product, such as a Digital Versatile Disc (DVD) or a memory stick. As a further alternative, the computer program 117 may be downloaded to the storage medium 116 over a network. The processing unit 115 may alternatively be embodied in the form of a digital signal processor (DSP), an application specific integrated circuit (ASIC), a field-programmable gate array (FPGA), a complex programmable logic device (CPLD), etc. The other network nodes, such as e.g. the MME 104, the SGSN 105 and the SGW 106, are also equipped with corresponding processing means.

In the art, when performing a handover of the UE 101 from e.g. the E-UTRAN 102 to the untrusted WLAN 103, i.e. from a 3GPP RAT to a non-3GPP RAT (WiFi), in the current standard as set out in TS 23.401, the MME 104 (in case of LTE) or SGSN 105 (in case of 2G/3G), the SGW 106 and the PGW 107 shall deactivate the PDN context on the 3GPP side for the PDN connection handed over to non-3GPP, and the MME/SGSN shall detach the UE 101 when the last PDN connection is handed over to non-3GPP, in this case exemplified with WiFi. The detach procedure can be triggered immediately at handover completion, or alternatively after some time as an implementation option. No UE context is maintained on the MME 104/SGSN 105 and the SGW 106 after completion of the detach procedure. Thus, in the current standard, a create session procedure must always be performed for the handover back from WiFI 103 to LTE 102, even if the same MME/SGSN to which the UE 101 was attached during the preceding handover from LTE 102 to WiFi 103 is selected for the WiFi-to-LTE handover. Further, an update location procedure is required towards the HSS 108 if a new MME/SGSN is selected for the WiFi-to-LTE handover, or if the previously selected MME/SGSN has detached the UE 101 since the last attach.

If the UE 101 moves back and forth between 3GPP 102 and non-3GPP RATs 103, the create session procedure (and possibly update location procedure) will thus be repeatedly triggered when performing the UE handover from the non-3GPP RAT 103 to the 3GPP RAT 102.

In normal cases, the HE 101 can keep its temporary ID, for example referred to as Globally Unique Temporary Identifier (GUTI) in LTE and Packet Temporary Mobile Subscriber Identity (P-TMSI) in GSM/UMTS, during handover between the 3GPP RAT 102 and the non-3GPP RAT 103. Only if there is an error, the UE 101 will discard its temporary ID, for example, an explicit reject is received from the network or registration timeout occurs. So, the RAN node (i.e. eNB or RNC) can select the same MME/SGSN node 104/105 based on the temporary ID provided by UE 101 in a Radio Resource Control (RRC) message.

In an embodiment of the present invention, in order to improve the performance for the handover from non-3GPP RAT 103 to 3GPP RAT 102, the MME 104 (or SGSN 105) in cooperation with the SGW 106 and the PGW 107 keeps the established PDN connection-context on the MME/SGSN for a certain time period, the SGW and the PGW when the UE 101 hands over from 3GPP RAT 102 to non-3GPP RAT 103. Advantageously, as a result, the MME/SGSN is not triggered to detach the UE 101 upon completion of the handover (at least not until the time period expires). When the UE 101 subsequently hands over back to the 3GPP RAT 102 from the non-3GPP RAT 103, the MME/SGSN maintains the established PDN connection context, and there is no need to perform the update location or the create session procedure.

Figure 2:
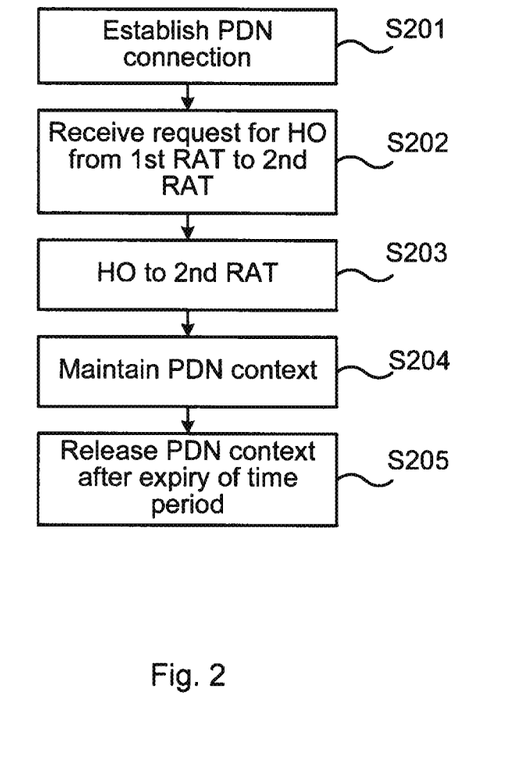
FIG. 2 illustrates a flowchart of an embodiment of the method of performing handover from a 3GPP RAT to a non-3GPP RAT according to the present invention.

FIG. 2 illustrates a flowchart of an embodiment of the method according to the present invention when the UE 101 is handed over from E-UTRAN 102 to WLAN 103. The method is in this particular embodiment exemplified to be performed at the PGW 107, but could alternatively further be performed in cooperation with the PGW 107, the SGW 106, the MME 104, the SGSN 105, etc. In a first step S201, a PDN connection is established with the UE 101 via the E-UTRAN 102. Thereafter, in step S202, a request for handover to the WLAN 103 is received from the UE 101 via the AP 110, and the PGW 107 effects a handover of the UE 101 in step S203 from the E-UTRAN 102 to the WLAN 103. Further, in step S204, the PGW 107 advantageously maintains PDN connection context for the PDN connection previously established to the E-UTRAN 102 for a time period, and releases the PDN connection context only at expiry of the time period.

Figure 3:
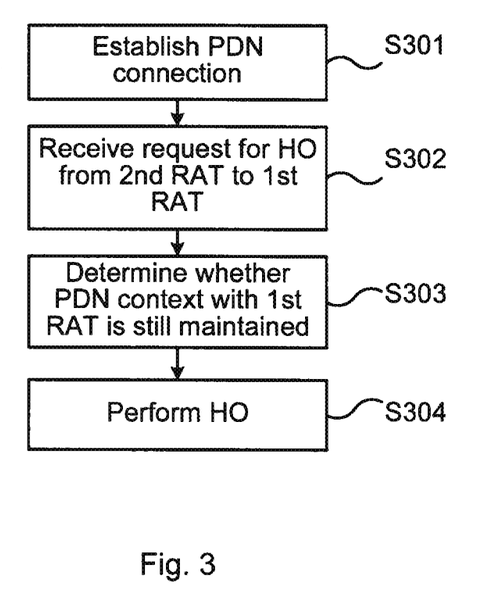
FIG. 3 illustrates a flowchart of a further embodiment of the method of performing handover from a non-3GPP RAT back to a 3GPP RAT according to the present invention.

FIG. 3 illustrates a flowchart of a further embodiment of the method according to the present invention when the UE 101 is handed over from WLAN 103 back to E-UTRAN 102. The method is in this particular embodiment exemplified to be performed at the MME 104 or the SGSN 105, but could alternatively further be performed in cooperation with the PGW 107, the SGW 106, etc. In a first step 301, a PDN connection is established with the UE 101 via the WLAN 103. Thereafter, in step S302, a request for handover to the E-UTRAN 103 is received from the UE 101 via the eNodeB 109, and the MME 104 advantageously determines in step S303 whether the PDN connection context of the UE 101 with the E-UTRAN 102 is still maintained. If so, the UE 101 is handed over to the E-UTRAN 102 in step S304 without the MME 104 performing update location with the HSS 108, and without creating a session with the SGW 106.

Figure 4:
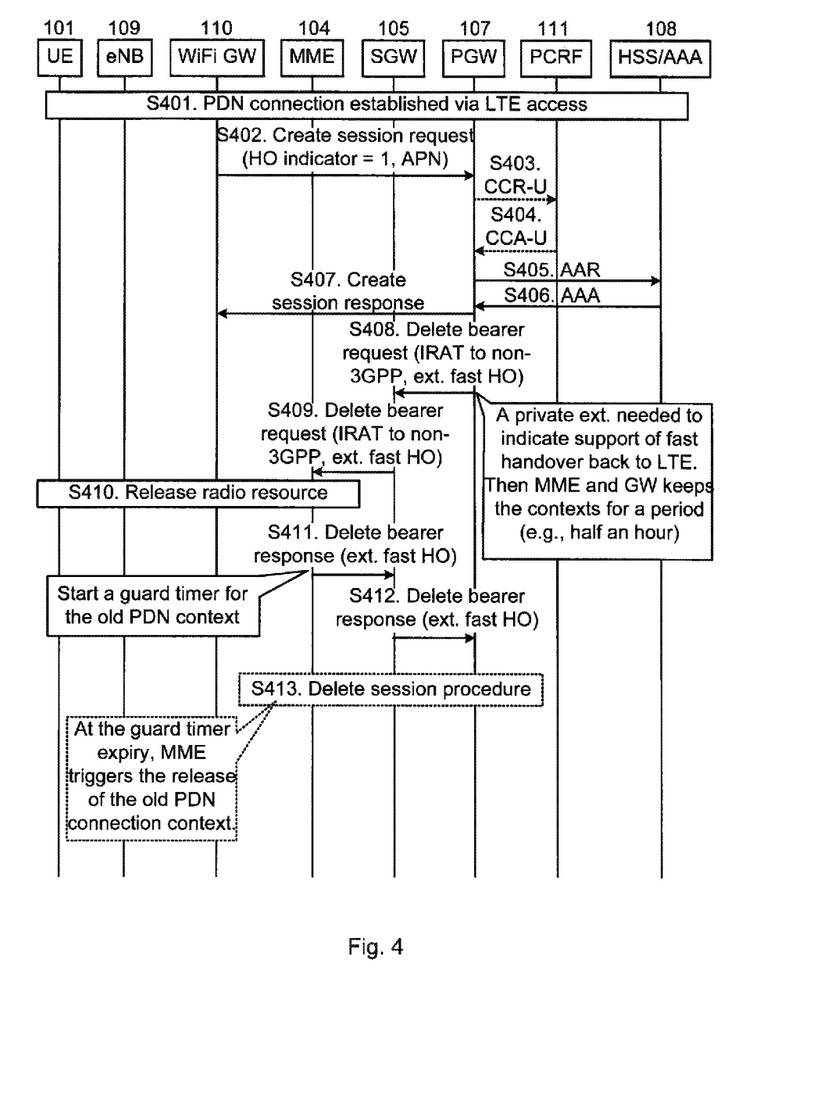
FIG. 4 shows a signalling diagram illustrating an embodiment of the present invention where a mobile terminal is handed over from E-UTRAN to WLAN.

FIG. 4 shows a signalling diagram illustrating an embodiment of the present invention where the UE 101 is handed over from E-UTRAN 102 to WLAN 103. It should be noted that handover from any 3GPP RAT to a non-3GPP RAT can be envisaged. In a first step S401, a PDN connection is established via LTE access, i.e. via the E-UTRAN 102 and eNodeB 109. If the UE 101 comes within range of the WLAN 103, and a handover is to be undertaken, a WiFi gateway such as an ePDG sends a request for handover in step S402 to the PGW 107 in the form of a Create Session Request indicating handover ("HO indicator=1") and Access Point Name (APN). In step S403, the PGW 107 may send a Credit Control Request (CCR-U) indicating RAT type to the PCRF 111 which replies with a Credit Control Answer (CCA-U) in step S404. The PGW 107 sends in step S405 an Authentication, Authorization and Accounting Request (AAR) to the HSS 108 which replies in step S406 with an Authentication Authorization and Accounting Answer (AAA). Then, the PGW 107 sends in step S407 to the WiFi gateway a Create Session Response in reply to the Create Session Request initially sent from the WiFi gateway in step S402.

Thereafter, in step S408, the PGW 107 sends a Delete Bearer Request to the SGW indicating that the RAT has changed from E-UTRAN to WLAN, and that E-UTRAN resources subsequently should be released. The Delete Bearer Request further indicates by means of an extension Information Element (IE) that the known "Fast Handover" scheme should be complied with when handing over the UE 101 from the E-UTRAN 102, if possible. As a result, in step S409, the SGW 106 in LTE shall (in case it supports the fast handover scheme) forward the Delete Bearer Request to the MME 104. Upon receiving the Delete Bearer Request, the MME 104 triggers in step S410 S1 connection release by sending to the UE 101 a Context Release Command, and further releases the S1 related resources of the UE 101.

In step S411, if the MME 104 supports the fast handover scheme, it sends a Delete Bearer Response to the SGW 106 including the "support fast handover" extension IE. The MME 104 shall keep the UE context, indicate a state of the UE 101 to be "handover to WLAN", i.e. to confirm in the light of the previously received Delete Bearer Request that the RAT changes from E-UTRAN to WLAN. Further, a guard timer is advantageously set for the PDN connection established with the UE 101 via the E-UTRAN 102 in step S401.

In Step S412, if the SGW supports "fast handover" function and has received the extension IE of "support fast handover" in Delete Bearer Request from PGW 107, the SGW 106 shall send the Delete Bearer Response with the extension IE to PGW and keep the PDN context. The PGW shall keep its local PDN context if it receives the Delete Bearer Response with the extension IE of "support fast handover".

Thus, the PDN connection context advantageously remains with the PGW 107 until the guard timer expires. Upon guard timer expiry, the MME 104 notifies the SGW 106 to release the current PDN context for the UE 101, and the SGW 106 will notify the PGW 107 accordingly. The session is thus deleted and the PDN connection context is released.

Figure 5:
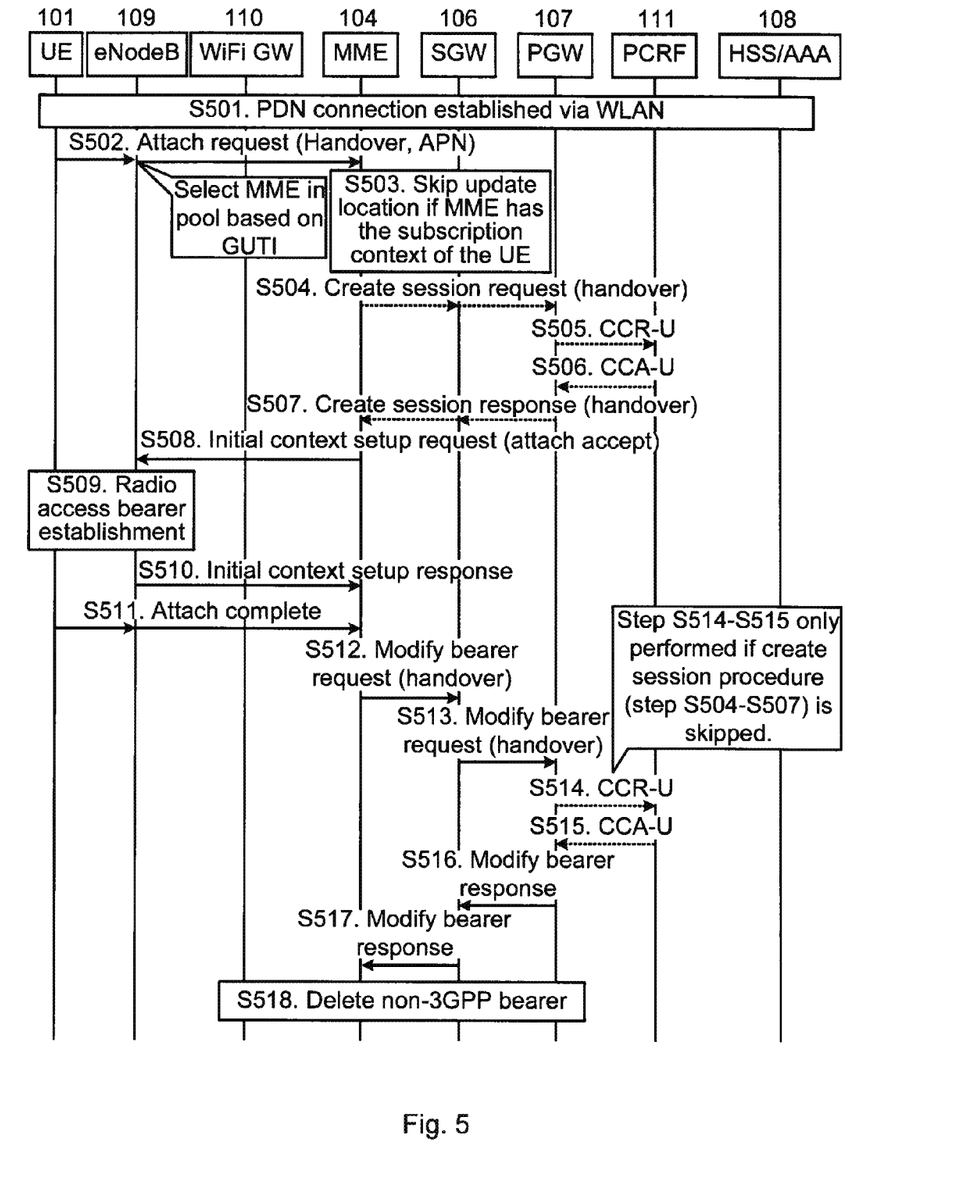
FIG. 5 shows a signalling diagram illustrating an embodiment of the present invention where the mobile terminal is handed over from WLAN to E-UTRAN following the handover process described with reference to FIG. 4.

FIG. 5 shows a signalling diagram illustrating an embodiment of the present invention where the UE 101 is handed over from WLAN 103 to E-UTRAN 102 (following the handover process described with reference to FIG. 4). In a first step S501, a PDN connection is established via WiFi access, i.e. via the WLAN 103 and the AP 110. If the UE 101 comes within range of the E-UTRAN 102, and a handover is to be undertaken, it sends via the eNodeB 109 a request for handover in step S502 to the MME 104 in the form of an Attach Request indicating handover and Access Point Name (APN). The eNodeB selects the MME 104 based on the GUTI contained in the previously discussed RRC message.

Upon receiving an Attach Request with Handover Indication in step S503, if the guard timer that was set in step S411 in FIG. 4 has not yet expired, i.e. the PDN context of the previously established PDN connection is still maintained, and the UE 101 has thus still not been detached from the E-UTRAN 102, the MME 104 holds the "old" UE context (i.e. the UE subscription data) corresponding to the PDN connection being handed over, which can be mapped to the GUTI, the MME 104 will advantageously refrain from performing the update location procedure with the HSS 108 and the create session procedure towards the SGW 106. In case the MME 104 does not hold the PDN context, steps S504-S507 will be performed. These steps correspond to steps S402, S403, S404 and S407, respectively, of FIG. 4 and will not be discussed further.

In step S508, the MME 104 responds with an Initial Context Setup Request (i.e. effectively an Attach Accept) to the eNodeB 109 and the UE 101 as at a normal attach procedure execution. As a result, the eNodeB 109 triggers radio bearer setup in step S509 and responds accordingly to the MME 104 in steps S510-S511. The UE 101 can send uplink traffic over LTE after the successful radio bearer setup.

In step S512, after reception of Initial Context Setup Response and Attach Complete, the MME 104 sends a Modify Bearer Request with eNodeB tunnel information and Handover Indication to the SGW 106 in accordance with the SGW address stored in the local UE context held by the MME 104. In step S513, the SGW 106 forwards the Modify Bearer Request with Handover Indication to the PGW 107 as the normal procedure due to handover from non-3GPP, i.e. WiFi. Optionally, if steps S504-S507 were not previously performed, steps S514 and S515 are performed accordingly. Finally, the PGW 107 returns a Modify Bearer Response in step S516 to the SGW 106, which forwards the Modify Bearer Response in step S517 to the MME 104, wherein the WLAN bearer context is released in step S518 as a normal handover procedure from WLAN 103 to E-UTRAN 102.

Figure 6:
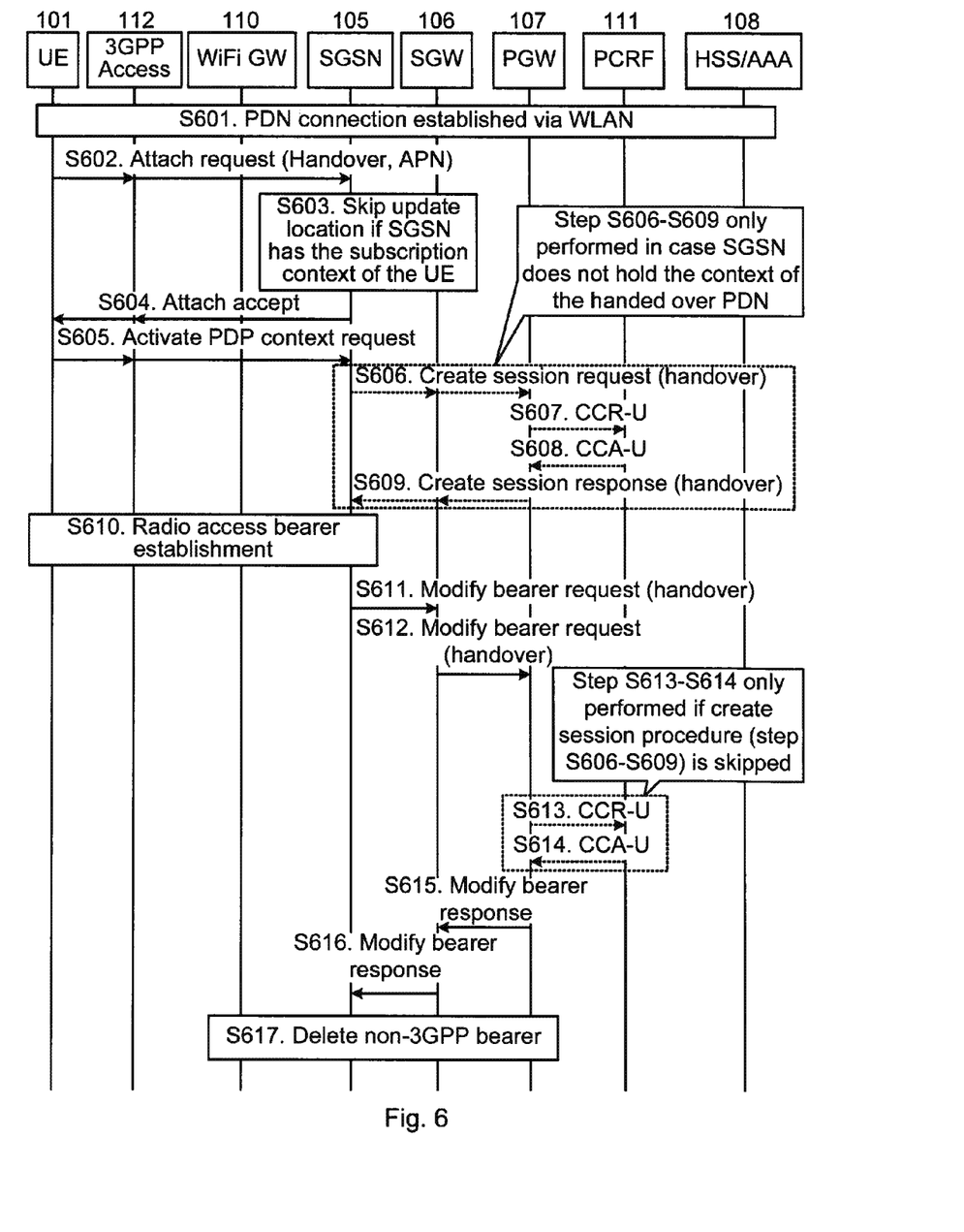
FIG. 6 shows a signalling diagram illustrating an embodiment of the present invention where the mobile terminal is handed over from WLAN to UTRAN following the handover process described with reference to FIG. 4.

FIG. 6 shows a signalling diagram illustrating an embodiment of the present invention where the UE 101 is handed over from WLAN 103 to UTRAN 111 (following the handover process described with reference to FIG. 4). As previously has been described, UTRAN is the radio access network of the 3G UMTS standard. The handover procedure of FIG. 6 is closely related to that described with reference to FIG. 5. In a first step S601, a PDN connection is established via WiFi access, i.e. via the WLAN 103 and the AP 110. If the UE 101 comes within range of the UTRAN 102, and a handover is to be undertaken, it sends via the NodeB 112 a request for handover in step S602 to the SGSN 104 in the form of an Attach Request indicating handover and APN. The NodeB 112 selects the SGSN 105 based on the UE Identity Information contained in the RRC message.

Upon receiving an Attach Request with Handover Indication in step S603, if the guard timer that was set in step S411 in FIG. 4 has not yet expired, i.e. the PDN context of the previously established PDN connection is still maintained and the UE 101 has thus still not been detached from the UTRAN 111, the SGSN 105 holds the "old" UE context (i.e. the UE subscription data) corresponding to the PDN connection being handed over, which can be mapped to the GUTI, the SGSN 105 will advantageously refrain from performing the update location procedure with the HSS 108. In step S604, the SGSN 106 responds with an Attach Accept to the NodeB 112 and the UE 101 as at a normal attach procedure execution.

Upon receiving an Activate PDP Context Request in step S605, the SGSN 105 will advantageously refrain from performing a create session procedure towards the SGW 106. In case the SGSN 105 does not hold the PDN context of the handed over UE 101, steps S606-S509 will be performed. These steps correspond to steps S402, S403, S404 and S407, respectively, of FIG. 4 and will not be discussed further. In step S610, the NodeB 112 triggers radio bearer setup. The UE 101 can send uplink traffic over UMTS after the successful radio bearer setup.

In step S611, the SGSN 105 sends a Modify Bearer Request with NodeB tunnel information and Handover Indication to the SGW 106 in accordance with the SGW address stored in the local UE context held by the SGSN 105. In step S612, the SGW 106 forwards the Modify Bearer Request with Handover Indication to the PGW 107 as the normal procedure due to handover from non-3GPP, i.e. WiFi. Optionally, if steps S606-S609 were not previously performed, steps S613 and S614 are performed accordingly. Finally, the PGW 107 returns a Modify Bearer Response in step S615 to the SGW 106, which forwards the Modify Bearer Response in step S616 to the SGSN 105, wherein the WLAN bearer context is released in step S617 as a normal handover procedure from WLAN 103 to UTRAN 112.

Figure 7:
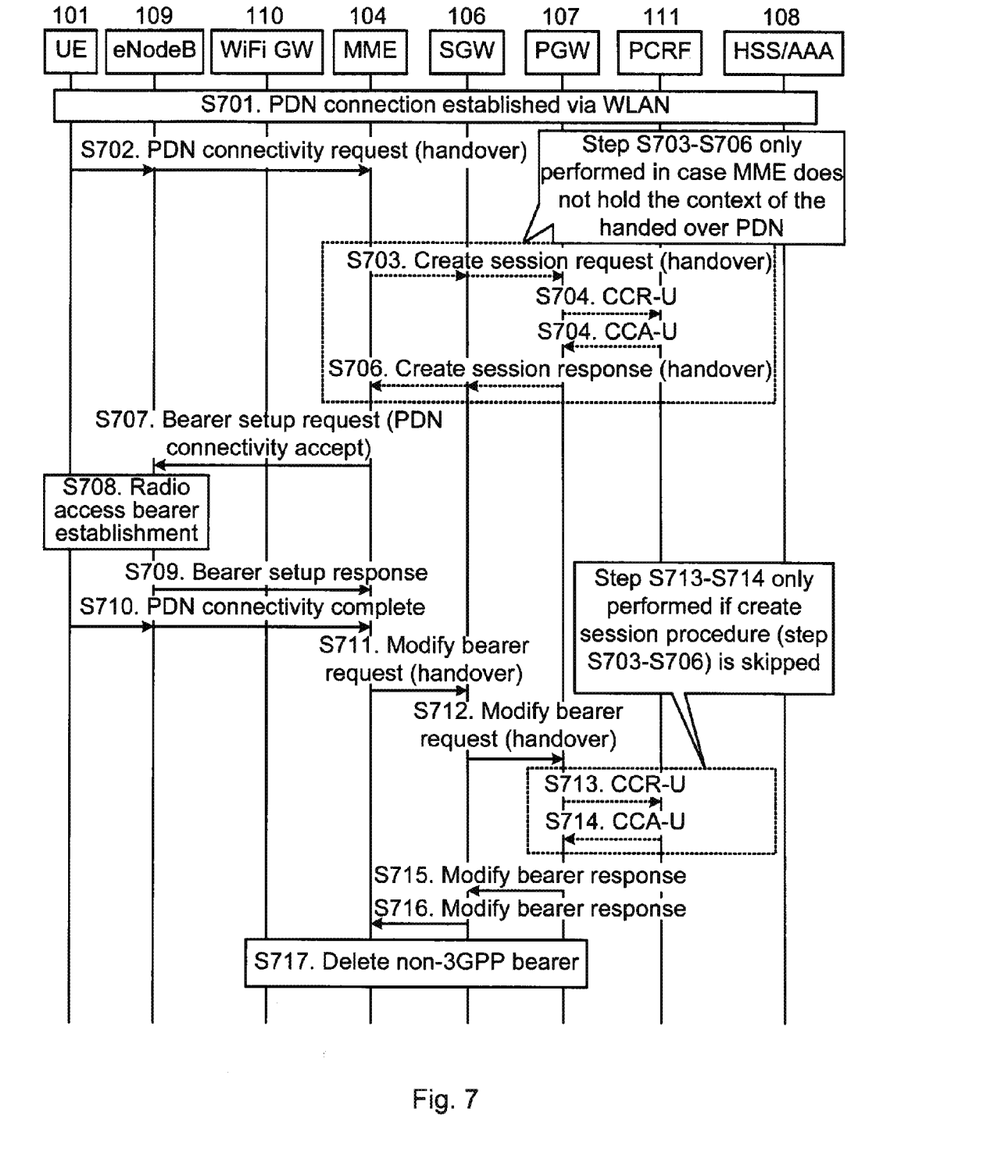
FIG. 7 shows a signalling diagram illustrating an embodiment of the present invention where the mobile terminal is handed over from WLAN to E-UTRAN following the handover process described with reference to FIG. 4.

FIG. 7 shows a signalling diagram illustrating an embodiment of the present invention where the UE 101 is handed over from WLAN 103 to E-UTRAN 102 (following the handover process described with reference to FIG. 4), but where the UE 101 already has an active PDN connection on the LTE side. In a first step S701, a PDN connection is established via WiFi access, i.e. via the WLAN 103 and the AP 110. If the UE 101 comes within range of the E-UTRAN 102, and a handover is to be undertaken, it sends via the eNodeB 109 a request for handover in step S702 to the MME 104 in the form of a PDN Connectivity Request. Upon receiving the PDN Connectivity Request, if the guard timer that was set in step S411 in FIG. 4 has not yet expired, i.e. the previously established PDN connection context is still maintained and the UE 101 has thus still not been detached from the E-UTRAN 102, the MME 104 holds the "old" UE context (i.e. the UE subscription data) corresponding to the PDN connection being handed over, and the MME 104 will advantageously refrain from performing the create session procedure towards the SGW 106. In case the MME 104 does not hold the PDN context, steps S703-S706 will be performed. These steps correspond to steps S402, S403, S404 and S407, respectively, of FIG. 4 and will not be discussed further.

In step S707, the MME 104 responds with a Bearer Setup Request (i.e. effectively a PDN Connectivity Accept) to the eNodeB 109 and the UE 101 as at a normal PDN connectivity procedure execution. As a result, the eNodeB 109 triggers radio bearer setup in step S708 and responds accordingly to the MME 104 in steps S709-S710 with a Bearer Setup Response and a PDN Connectivity Complete. The UE 101 can send uplink traffic over LTE after the successful radio bearer setup.

In step S711, the MME 104 sends a Modify Bearer Request with eNodeB tunnel information and Handover Indication to the SGW 106 in accordance with the SGW address stored in the local UE context held by the MME 104. In step S712, the SGW 106 forwards the Modify Bearer Request with Handover Indication to the PGW 107 as the normal procedure due to handover from non-3GPP, i.e. WiFi. Optionally, if steps S703-S706 were not previously performed, steps S713 and S714 are performed accordingly. Finally, the PGW 107 returns a Modify Bearer Response in step S715 to the SGW 106, which forwards the Modify Bearer Response in step S716 to the MME 104, wherein the WLAN bearer context is released in step S717 as a normal handover procedure from WLAN 103 to E-UTRAN 102.

Figure 8:
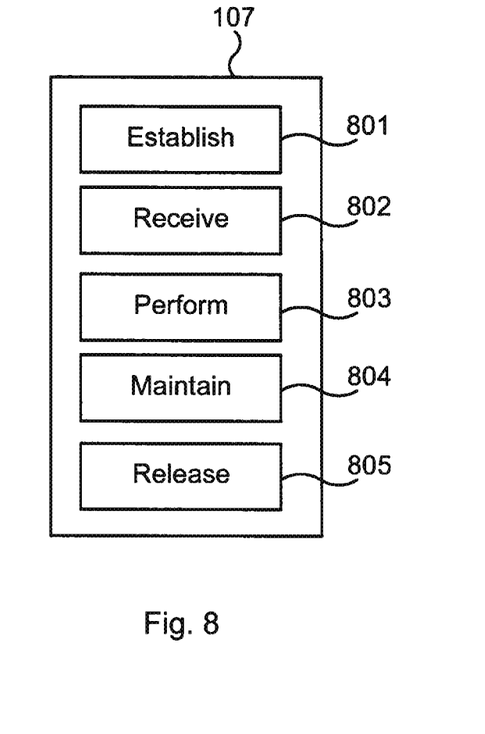
FIG. 8 shows a network node according to an embodiment of the present invention.

FIG. 8 shows a network node 107 of a packet core network of performing handover of a mobile terminal between a first RAT and a second RAT in a wireless communications system according to an embodiment of the present invention. The network node 107 comprises establishing means 801 adapted to establish a PDN connection with the mobile terminal via the first RAT, receiving means 802 adapted to receive a request for handover of the mobile terminal to the second RAT, performing means 803 adapted to perform handover of the mobile terminal to the second RAT. Further, the network node 107 comprises maintaining means 804 adapted to maintain PDN connection context for the PDN connection established via the first RAT for a time period, and releasing means 805 adapted to release the PDN connection context at expiry of the time period. The network node 107 may further comprise a local storage for storing obtained data. The various means 801-805 may (in analogy with the description given in connection to FIG. 1) be implemented by a processor embodied in the form of one or more microprocessors arranged to execute a computer program downloaded to a suitable storage medium associated with the microprocessor, such as a RAM, a Flash memory or a hard disk drive. The various means 801-805 may further comprise one or more transmitters and/or receivers and/or transceivers, comprising analogue and digital components and a suitable number of antennae for radio communication.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method by a network node of a packet core network of performing handover of a mobile terminal between a first Radio Access Technology (RAT) and a second RAT in a wireless communications system, comprising:
    establishing a first Packet Data Network (PDN) connection with the mobile terminal via the first RAT;
    receiving a first handover request, said first handover request for handover of the mobile terminal from the first RAT to the second RAT;
    performing handover of the mobile terminal to the second RAT;
    after performing the handover of the mobile terminal to the second RAT, the network node of the packet core network maintaining a PDN connection context for said first PDN connection established via the first RAT for a time period, said PDN connection context comprising context information corresponding to said PDN connection, said context information comprising an identifier for identifying the mobile terminal; and
    releasing the PDN connection context for the first PDN connection for the mobile terminal at expiry of said time period.

2. The method of claim 1, further comprising the steps of:
    establishing a second PDN connection with the mobile terminal via the second RAT;
    receiving a second handover request, said second handover request for handover of the mobile terminal from the second RAT to the first RAT;
    after receiving the second handover request for handover of the mobile terming from the second RAT to the first RAT, the network node of the packet core network determining whether the PDN connection context for said first PDN connection established via the first RAT is still maintained; and
    as a result of determining that the PDN connection context for said first PDN connection established via the first RAT is still maintained, performing handover of the mobile terminal to the first RAT without performing update location with a Home Subscriber Server (HSS) and without creating a session with a Serving Gateway (SGW).

3. The method of claim 2, wherein the step of determining whether the PDN connection context for said first PDN connection established via the first RAT is still maintained comprises:
    determining whether said network node has access to subscription data of the mobile terminal in accordance with the request for handover to the first RAT.

4. The method claim 1, wherein the second handover request comprises an attach request indicating handover and identifying the mobile terminal.

5. The method of claim 1, said network node being one of: a Mobility Management Entity, MME, a Serving Gateway, SGW, and a Packet Data Network Gateway, PGW, in a Long Term Evolution, LTE, network, a Serving General Packet Radio Service Support Node, SGSN, and a Gateway General Packet Radio Service Support Node, GGSN, in a Universal Mobile Telecommunication System, UMTS, network, a Serving General Packet Radio Service Support Node, SGSN, and a Gateway General Packet Radio Service Support Node, GGSN, in a Global System for Mobile communications, GSM, network.

6. The method of claim 5, further comprising transmitting a delete bearer response indicating handover from the first RAT to the second RAT and further indicating that the network node will maintain the PDN connection context for said first PDN connection for the time period.

7. The method according to claim 5, wherein the SGW and the PGW are made aware of the request for handover from the second RAT to the first RAT by receiving a modify bearer request indicating the handover.

8. A computer program product comprising a non-transitory computer readable medium, the non-transitory computer readable medium storing a computer program comprising computer-executable instructions for causing a device to perform steps recited in claim 1 when the computer-executable instructions are executed on a processing unit included in the device.

9. The method of claim 1, wherein the identifier for identifying the mobile terminal is an Internet Protocol (IP) address allocated to the mobile terminal.

10. The method of claim 1, wherein the identifier for identifying the mobile terminal is a subscriber identity allocated to the mobile terminal.

11. The method of claim 10, wherein the subscriber identity is an International Mobile Subscriber Identity (IMSI).

12. The method of claim 1, wherein the context information further comprises an identifier for identifying a Serving Gateway (SGW).

13. A first network node of a packet core network of performing handover of a mobile terminal between a first Radio Access Technology, RAT, and a second RAT in a wireless communications system, comprising a processing unit and a memory, said memory containing instructions executable by said processing unit, whereby said first network node is operative to:
  establish a first Packet Data Network (PDN) connection with the mobile terminal via the first RAT;
  receive a first handover request, said first handover request for handover of the mobile terminal from the first RAT to the second RAT;
  perform handover of the mobile terminal to the second RAT;
  after performing the handover of the mobile-terminal to the second RAT, maintain a PDN connection context for said first PDN connection established via the first RAT for a time period, said PDN connection context comprising context information corresponding to said first PDN connection, said context information comprising an identifier for identifying the mobile terminal; and
  release the PDN connection context for the first PDN connection for the mobile terminal at expiry of said time period.

14. The first network node of claim 13, said first network node being a Packet Data Network Gateway, PGW, in a Long Term Evolution, LTE, network.

15. A network node of a packet core network, the network node of the packet core network comprising a processing unit and a memory, said memory containing instructions executable by said processing unit, wherein said network node is operative to:
  establish a first PDN connection with the mobile terminal via a first radio access technology (RAT);
  receive a request for handover of the mobile terminal to a first RAT;
  determine whether a PDN connection context for said first PDN connection is maintained; and
  as a result of determining that the PDN connection context is maintained, perform handover of the mobile terminal to the first RAT without performing update location with a Home Subscriber Server (HSS) and without creating a session with a Serving Gateway (SGW).

16. The network node of claim 15, said network node being any one selected from a group comprising a Mobility Management Entity, MME, in a Long Term Evolution, LTE, network, a Serving General Packet Radio Service Support Node, SGSN, in a Universal Mobile Telecommunication System, UMTS, and a Serving General Packet Radio Service Support Node, SGSN, in a Global System for Mobile communications, GSM, network.

17. The network node of claim 15, wherein the determining whether the PDN connection context is maintained comprises determining whether said network node has access to subscription data of the mobile terminal in accordance with the first handover request.

18. The network node of claim 15, wherein the request for handover comprises an attach request indicating handover and identifying the mobile terminal.

* * * * *